United States Patent
Roberts-Hoffman et al.

(10) Patent No.: US 10,209,821 B2
(45) Date of Patent: Feb. 19, 2019

(54) COMPUTING DEVICES HAVING SWIPING INTERFACES AND METHODS OF OPERATING THE SAME

(71) Applicant: Google Inc., Mountain View, CA (US)

(72) Inventors: Katie Leah Roberts-Hoffman, San Jose, CA (US); Premal Parekh, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/451,009

(22) Filed: Mar. 6, 2017

(65) Prior Publication Data

US 2017/0285843 A1  Oct. 5, 2017

Related U.S. Application Data

(60) Provisional application No. 62/318,433, filed on Apr. 5, 2016.

(51) Int. Cl.
*G06F 3/041* (2006.01)
*G06F 3/01* (2006.01)
(Continued)

(52) U.S. Cl.
CPC ........... *G06F 3/0416* (2013.01); *G06F 1/169* (2013.01); *G06F 1/1616* (2013.01);
(Continued)

(58) Field of Classification Search
CPC ... G06F 3/0416; G06F 3/02217; G06F 3/0488
(Continued)

(56) References Cited

U.S. PATENT DOCUMENTS 7,629,400 B2 * 12/2009 Hyman .................... B41M 1/30
524/106
8,239,785 B2   8/2012 Petschnigg et al.
(Continued)

FOREIGN PATENT DOCUMENTS

CN  102346833 A  2/2012
EP  2439608 A1  4/2012

OTHER PUBLICATIONS

Office Action for GB Patent Application No. 1705021.2, dated Sep. 12, 2017, 8 pages.
(Continued)

*Primary Examiner* — Prabodh M Dharia
(74) *Attorney, Agent, or Firm* — Brake Hughes Bellermann LLP

(57) ABSTRACT

Computing devices may include one or more swiping interfaces provided on a base portion and/or a display portion of the computing device. For example, a computing device may include a display disposed within a housing, and a plurality of touch cells in a linear arrangement along an edge portion of the housing. Each of the plurality of touch cells may emit touch fields through the housing at a corresponding surface of the housing. The computing device may also include a processor that can execute machine-readable instructions, allowing the computing device to receive a plurality touch input signals from the plurality of touch cells, and to operate the computing device in response to the received plurality of touch input signals.

17 Claims, 11 Drawing Sheets

(51) Int. Cl.

| | | |
|---|---|---|
| *G06F 3/038* | (2013.01) | |
| *G06F 3/0488* | (2013.01) | |
| *G06F 3/0484* | (2013.01) | |
| *G06F 3/0354* | (2013.01) | |
| *G06F 3/02* | (2006.01) | |
| *G06F 1/16* | (2006.01) | |
| *G06F 3/0485* | (2013.01) | |

(52) U.S. Cl.
CPC ............ *G06F 1/1637* (2013.01); *G06F 3/016* (2013.01); *G06F 3/0227* (2013.01); *G06F 3/038* (2013.01); *G06F 3/03547* (2013.01); *G06F 3/0485* (2013.01); *G06F 3/0488* (2013.01); *G06F 3/04847* (2013.01); *G06F 3/04855* (2013.01); *G06F 3/04883* (2013.01); *G06F 2203/0339* (2013.01)

(58) Field of Classification Search
USPC ...... 345/156–184; 385/116, 146; 715/64, 69
See application file for complete search history.

(56) References Cited

U.S. PATENT DOCUMENTS

| | | | |
|---|---|---|---|
| 8,866,786 B2 | 10/2014 | Cahill et al. | |
| 8,988,190 B2 | 3/2015 | Denhez et al. | |
| 2006/0238517 A1 | 10/2006 | King et al. | |
| 2008/0165116 A1* | 7/2008 | Herz .................... | G09G 3/3406 345/102 |
| 2009/0049646 A1* | 2/2009 | Rubin ................. | H04M 1/0237 16/319 |
| 2009/0091545 A1* | 4/2009 | Wang .................... | G06F 1/1626 345/173 |
| 2009/0296331 A1* | 12/2009 | Choy .................... | G06F 1/1616 361/679.09 |
| 2010/0026656 A1 | 2/2010 | Hotelling et al. | |
| 2011/0038114 A1 | 2/2011 | Pance et al. | |
| 2011/0158601 A1* | 6/2011 | Lew ..................... | G02B 6/0046 385/146 |
| 2011/0256848 A1 | 10/2011 | Bok et al. | |
| 2012/0019356 A1 | 1/2012 | Gagneraud et al. | |
| 2012/0304107 A1 | 11/2012 | Nan et al. | |
| 2012/0329524 A1* | 12/2012 | Kent ....................... | G06F 3/044 455/566 |
| 2013/0024796 A1* | 1/2013 | Seo ..................... | G06F 3/04883 715/769 |
| 2013/0063358 A1* | 3/2013 | Huang .................. | G06F 1/1616 345/168 |
| 2013/0093687 A1 | 4/2013 | Papakipos et al. | |
| 2013/0215048 A1* | 8/2013 | Jang ....................... | G06F 3/0488 345/173 |
| 2013/0321337 A1 | 12/2013 | Graham et al. | |
| 2014/0099992 A1* | 4/2014 | Burns ....................... | G06F 3/044 455/550.1 |
| 2014/0115465 A1* | 4/2014 | Lee ........................... | G06F 3/01 715/716 |
| 2014/0267122 A1* | 9/2014 | Morton ................... | G06F 1/169 345/173 |
| 2015/0130764 A1 | 5/2015 | Woolley et al. | |
| 2015/0145781 A1* | 5/2015 | Lewis ..................... | G06F 1/169 345/173 |
| 2015/0145805 A1 | 5/2015 | Liu | |
| 2015/0169071 A1 | 6/2015 | Jitkoff | |
| 2015/0268725 A1* | 9/2015 | Levesque ................ | G06F 3/016 345/156 |
| 2015/0301688 A1* | 10/2015 | Cho ....................... | G06F 3/0421 345/175 |
| 2015/0324570 A1* | 11/2015 | Lee ....................... | G06K 9/3208 382/124 |
| 2015/0338982 A1* | 11/2015 | Dufva ..................... | G06F 3/023 345/168 |
| 2016/0117083 A1* | 4/2016 | Nishida ............... | G06F 3/04842 715/764 |
| 2016/0164865 A1* | 6/2016 | Speicher ............. | H04L 63/0861 726/4 |
| 2016/0188181 A1* | 6/2016 | Smith ..................... | G06F 3/048 715/765 |
| 2017/0177162 A1* | 6/2017 | Ribeiro ................. | G06F 3/0414 |
| 2017/0206055 A1* | 7/2017 | Baker ..................... | G06F 3/165 |

OTHER PUBLICATIONS

"Xperia™ Z5", retrieved on Nov. 23, 2015 from http://www.sonymobile.com/globalen/products/phones/xperiaz5/#Specifications, 11 pages.

Butler, et al., "SideSight: Multi-"touch" interaction around small devices", Proceedings of the 21st annual ACM symposium on User interface software and technology, Oct. 19-22, 2008, 4 pages.

Hill, "15 Handy Galaxy S6 Edge Tips to Help You Get More From Your Phone", retrieved from http://www.digitaltrends.com/mobile/galaxys6edgetipsandtricks/ on Nov. 23, 2015, Sep. 17, 2015, 8 pages.

Daniel P., "5 phones with fingerprint scanners on the side", retrieved on Nov. 23, 2015 from http://www.phonearena.com/news/5phoneswithfingerprintscannersontheside_id73484, Sep. 7, 2015, 7 pages.

Wolf, et al., "A Study of On-Device Gestures", MobileHCI'11, Sep. 21-24, 2012, 6 pages.

\* cited by examiner

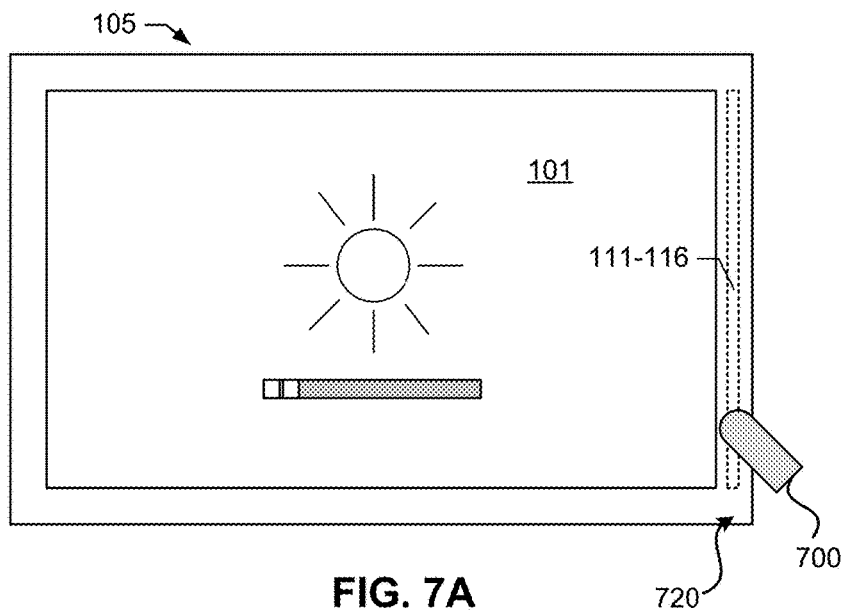
FIG. 7A
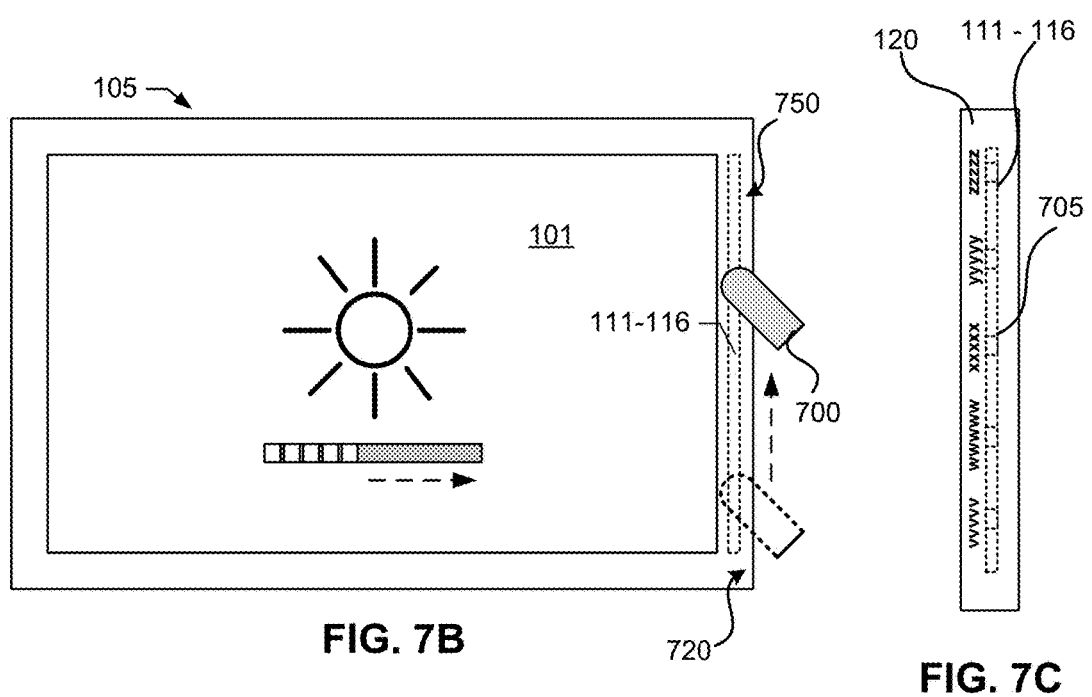
FIG. 7B
FIG. 7C

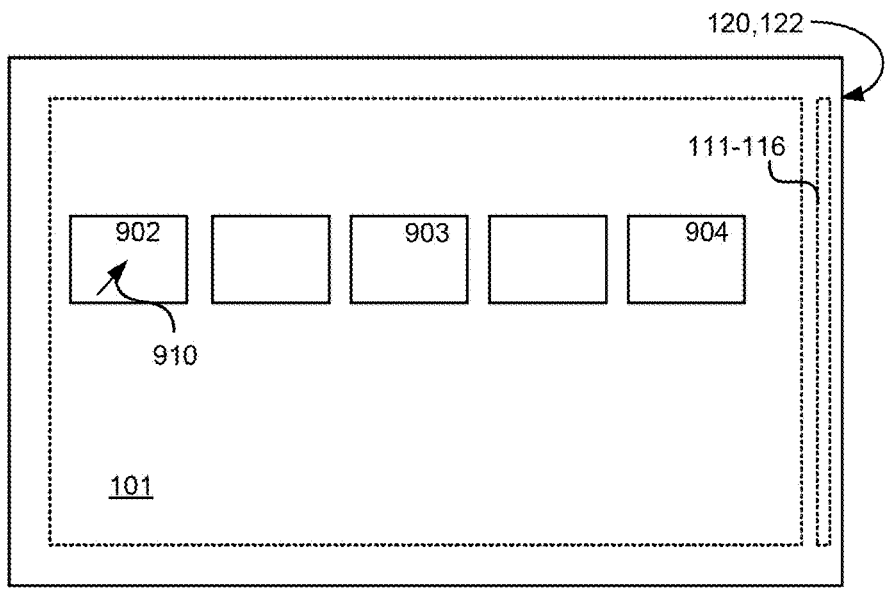
FIG. 9A
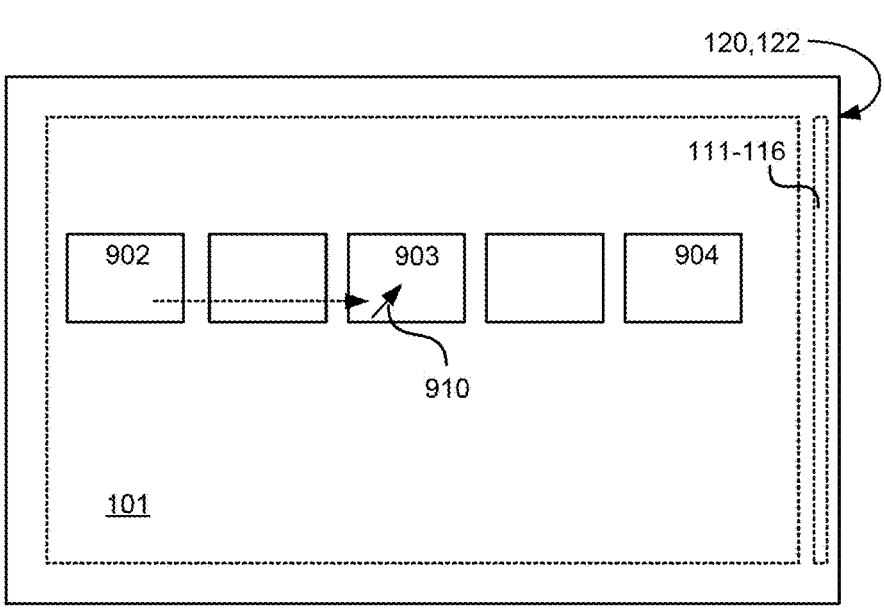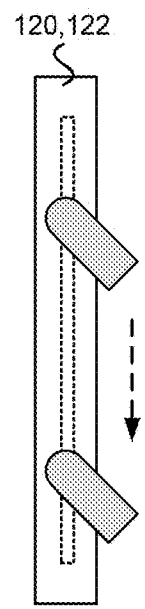
FIG. 9B
FIG. 9C

COMPUTING DEVICES HAVING SWIPING INTERFACES AND METHODS OF OPERATING THE SAME

CROSS REFERENCE TO RELATED APPLICATION

This application is a Non-Provisional of, and claims priority to, U.S. Provisional Application No. 62/318,433, filed on Apr. 5, 2016, the disclosure of which is incorporated by reference herein in its entirety.

FIELD

This disclosure relates generally to computing devices, and, more particularly, to computing devices having swiping interfaces, and methods of operating the same.

BACKGROUND

Computing devices may have one or more user input devices that allow a user to provide inputs to the computing device. Example user input devices include, but are not limited to, keyboards, mice, trackpads, touchpads, touch displays, microphones, touch screens, etc. Example computing devices include, but are not limited to, portable computers, laptop computers, mobile devices (e.g., smartphones, media players, game players, mobile phones, etc.), desktop computers, etc.

SUMMARY

Computing devices having swiping interfaces and methods of operating the same are disclosed herein. In one aspect, a computing device may include a first housing, a display disposed within the first housing, a first plurality of touch cells disposed within the first housing, in a linear arrangement outside of the display, wherein the first plurality of touch cells respectively emit a first plurality of signals through a first surface of the first housing, a processor, and a non-transitory computer-readable storage medium storing instructions. When executed by the processor, the instructions cause the processor to receive a first plurality of touch input signals from the first plurality of touch cells; and operate the computing device in accordance with the first plurality of touch input signals.

In another aspect, a method of operating a computing device having a housing and a display disposed within the housing may include operating a plurality of touch cells to respectively emit a plurality of signals through the housing, the plurality of touch cells being arranged linearly within the housing, along an edge portion of the housing, outside the display, receiving a plurality of touch input signals from the plurality of touch cells, and operating the computing device in response to the plurality of touch input signals, including unlocking the computing device from a standby state or an off state in response to the plurality of touch input signals.

In another aspect, a computer program product may be embodied on a non-transitory computer readable medium, the computer readable medium having stored thereon a sequence of instructions. When executed by a processor, the instructions may cause the processor to execute a method, including operating a plurality of touch cells to respectively emit a plurality of signals through a housing of a computing device, the plurality of touch cells being arranged linearly within the housing, along an edge portion of the housing, outside a display positioned in the housing, receiving a plurality of touch input signals from the plurality of touch cells, and operating the computing device in response to the plurality of touch input signals, including unlocking the computing device from a standby state or an off state in response to the plurality of touch input signals.

BRIEF DESCRIPTION OF THE DRAWINGS

FIGS. 7A-7B illustrate other example usages of the example swiping interfaces disclosed herein.

FIG. 7C is a side view of the example swiping interface of FIGS. 7A-7B.

FIGS. 9A and 9B illustrate additional example usages of the example swiping interfaces disclosed herein.

FIG. 9C is a side view of the example swiping interface of FIGS. 9A and 9B.

DETAILED DESCRIPTION

Figure 1:
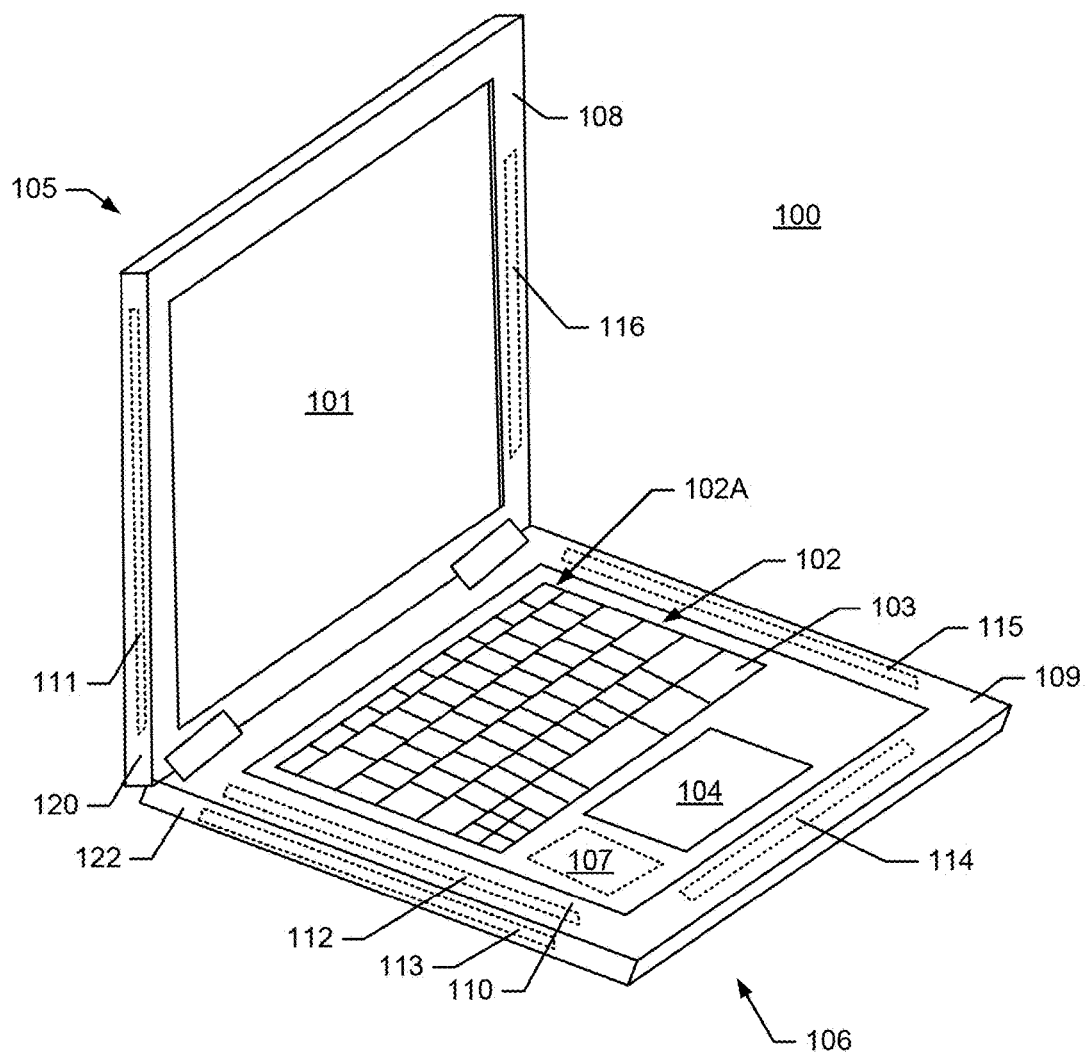
FIG. 1 is schematic illustration of an example computing device (e.g., a laptop computer) having a swiping interface in accordance with the teachings of this disclosure.

Computing devices may rely on input devices such as keyboards, mice, trackpads, touchpads, touch displays, microphones, touch screens, and the like to receive user inputs. In a computing device such as a laptop computer, the laptop computer is opened before built-in input devices can be accessed and used. When opening a laptop computer, the user typically has to wait for the computer to resume or restart before the user can login and begin using the computer. This can be inefficient and frustrating for the user. Further, the user may have to first login before selecting an application for use. Further still, input devices associated with traditional laptop computers typically have fixed functionality, which can result in inefficient usage when a laptop computer supports multiple configurations, such as a conventional laptop mode, a presentation or tent mode, and a tablet mode. These fixed functionality input devices can waste the scant resources that could preferably be used to, for example, reduce the size of a laptop computer. Even further, when a touch screen is used to navigate a user interface, undesirable smudge prints may be left behind on the touch surface of the touch screen by the naturally occurring oils on the skin of users. Still further, if a touch screen is used to unlock a laptop, the pattern of smudge prints may be used to facilitate an unauthorized login into another's laptop, thereby reducing and/or compromising security.

Swiping interfaces on computing devices, such as, for example, a laptop computer, are disclosed herein that overcome at least these problems. The swiping interfaces disclosed herein enable a user to provide inputs for operating a laptop by swiping, sliding and tapping one or more fingers, a stylus, and other selection implements along one or more sensors configured to detect these types of inputs. In some implementations, the swiping, sliding and/or tapping may move back and/or forth, up and/or down, diagonally and/or back, and other such directions, on sensors including, for example, touch sensor(s), resistive sensor(s), pressure sensor(s), force sensor(s), piezoelectric sensor(s), and other such sensors capable of detecting the swiping motion of the finger, stylus, or other selection implement at or near the touch surface. In some implementations, a sequence of swiping motions may be detected using more than one set of sensors. For example, a first motion may be detected by a first set of sensors, a back and forth motion may be detected by a second set of sensors, etc. While laptop computers are used herein to illustrate example swiping interfaces and methods of using the same, the examples disclosed herein may be used in connection with other computing devices such as, but not limited to, desktop computers, tablets, convertible laptops, smartphones, game controllers, netbooks, e-book readers, etc.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s). These examples and variants and portions thereof shown in the attached drawings are not drawn to scale, with specific shapes, or with specific relative dimensions as they are not important to this disclosure and may render the drawings more difficult to comprehend. Specific elements may have been intentionally exaggerated for discussion purposes. Instead, the drawings have been drawn for clarity and comprehension. Further, the arrangement of elements and couplings maybe changed, rearranged, etc. according to other implementations of this disclosure and the claims herein.

Figure 11:
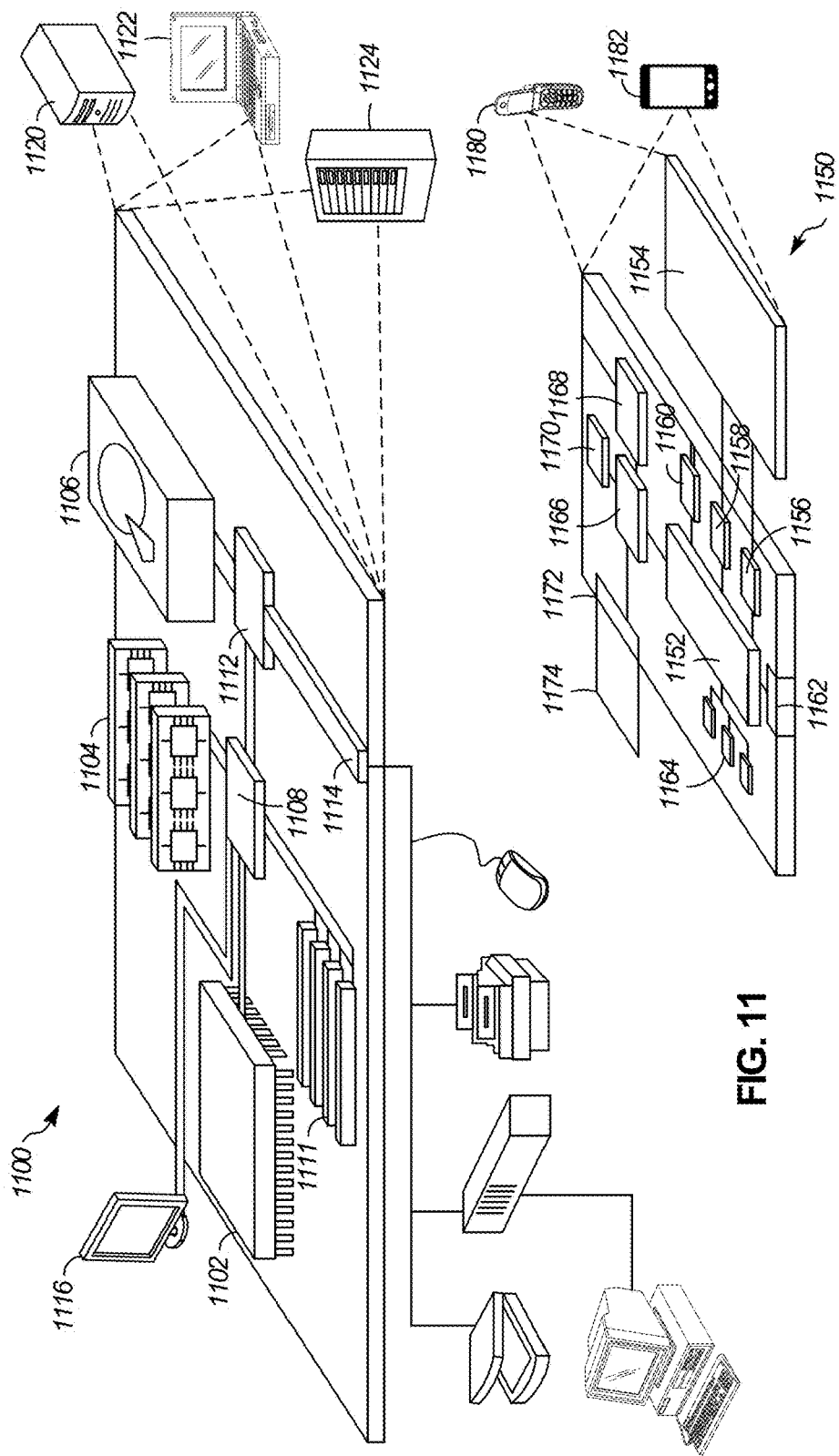
FIG. 11 is a block schematic diagram of an example computer device and an example mobile computer device that may be used to implement the example apparatus, methods and usages disclosed herein.

FIG. 1 shows an example computing device in the form of a laptop computer 100. The example laptop computer 100 of FIG. 1, which may be battery powered, includes a display 101, a keyboard 102 having one or more keys (one of which is designated at reference numeral 103), and a trackpad 104 through which a user can interact with the laptop computer 100. The trackpad 104 may be implemented by a touch pad. The example laptop 100 is implemented using an upper or first housing, or lid 105 within which the display 101 is disposed; and a lower or second housing, or base 106 within which the keyboard 102, trackpad 104 and typically a processor 107 such as the example processor 1152 of FIG. 11 are disposed. The processor 107 may be any type of processor made by any manufacturer. The lid 105 and the base 106 may be mechanically coupled (e.g., via a hinge) and electrically coupled. The lid 105 has a bezel 108 surrounding the display 101 that retains the display 101 in place within the lid 105. The base 106 has a top surface 109 including a border 110 that retains, among other things, the keyboard 102, the trackpad 104, and the processor 107 in place.

The example laptop 100 may include one or more swiping interfaces. In the example shown in FIG. 1, the example laptop includes six swiping interfaces 111-116. These six example swiping interfaces 111-116 will discussed in more detail below in connection with FIGS. 2-5. In the example implementations discussed below, different examples of the swiping interfaces 111-116 are illustrated to make clear that one or more of the example swiping interfaces 111-116, each at a different location, may be used in any particular laptop (or other computing device). Moreover locations other than those shown in FIG. 1 may additionally and/or alternatively be used to implement the swiping interfaces 111-116, or other swiping interfaces. In FIG. 1, the swiping interfaces 111-116 are illustrated with dotted lines, as the swiping interfaces may be implemented within the lid 105 and/or within the base 106 for aesthetic and/or functional reasons. However, in some implementations, one or more of the swiping interfaces 111-116 may be visible (rather than positioned within the lid 105 and/or base 106, as thus not externally visible). In some examples, at least the portions of the first and second housings 105, 106 that include the swiping interfaces 111-116 may be formed of, for example, an oleophobic material or coating that reduces the formation of smudge prints on the housings 105, 106.

In the examples illustrated herein, the swiping interfaces 111-116 are arranged in substantially linear configurations along edge portion(s) 120 of the lid 105 (e.g., the portion of the example laptop 100 containing the display 101) and/or along edge portion(s) 122 of the base 106 (e.g., the portion of the example laptop containing the keyboard 102) of the laptop computer 100. However, other configurations such as an L-configuration, a folded configuration (e.g., see FIG. 5), etc. are contemplated.

The swiping interfaces 111-116 disclosed herein can be used in connection with numerous different types of input devices, an may additionally or alternatively be used to replace and/or augment some of the functionality of input devices either statically (e.g., defined at manufacture of the laptop 100) and/or dynamically (e.g., changeable during operation of the laptop 100). For example, as shown in FIG. 1, some, or all, of the functionality of a row 102A of function keys and/or shortcut keys of the keyboard may be implemented by the disclosed swiping interfaces 111-116, either statically and/or dynamically. In some examples, swiping interfaces 111-116 can additionally be used as tap and/or soft key interfaces. For example, a user may tap one of the swiping interfaces 111-116 a first number of times to instruct the laptop 100 to perform a first action, such as open an application, may tap one of the swiping interfaces 111-116 a second number of times to activate a set of soft keys such as function keys and/or shortcut keys, etc.

Because the swiping interfaces 111-116 disclosed herein can be disposed on the exterior of computing devices, the swiping interfaces 111-116 can be used, in some examples, to unlock the laptop 100 before the user begins to open the laptop 100 (for example, before the user rotates the lid 105, from a closed position in which the display 101 is positioned essentially against the keyboard 102, away from the base 106 to an open position to expose the display 101 and the keyboard 102). This may allow the laptop 100 to utilize the time it takes to open and position the laptop 100 to resume operation, or to boot, making the process of unlocking and opening the laptop 100 more efficient. In some examples, the swiping interface 111-116 used to unlock a laptop 100 is internal to avoid an inadvertent unlock of the laptop 100. In some examples, the swiping interface may be used to additionally and/or alternatively select the application that is to be active. For example, a swipe of an external swiping interface 111-116 may be used to instruct the laptop 100 as to which application is to be active when operation of the laptop 100 is resumed and/or the laptop 100 is booted.

Further, because the swiping interfaces 111-116 disclosed herein can be readily (re-)configured, swiping interfaces 111-116 can be used to support operation of the laptop in multiple configurations, such as, for example, a laptop mode (as shown in FIG. 1), a presentation mode, and a tablet mode. For example, when transitioning from the laptop mode, a swiping interface configured to unlock the laptop computer 100 in laptop mode can be (re-)configured to start and stop a video, go back or forward thirty seconds in a video, etc. Moreover, in some implementations, a running application can define the functionality assigned to the swiping interfaces 111-116. Further still, the swiping interfaces 111-116 can be (re-)configured for left-handed and right-handed users. Moreover, (re-)configurable swiping interfaces may allow the size of the laptop 100 to be reduced, because swiping interfaces 111-116 can be (re-)configured for multiple uses, rather than relying on dedicated input interfaces for designated functions and inputs.

The disclosed example swiping interfaces 111-116 may additionally or alternatively be used to, among other things, adjust a volume, adjust a brightness, scroll the contents of a window, navigate a list of items, move forward in a web browser window, move backward in a web browser window, open an application, etc. The example swiping interfaces 111-116 can additionally or alternatively provide touch zones that can operate as soft keys or virtual keys.

The example swiping interfaces 111-116 disclosed herein can be realized using, for example, touch field signals emitted by a touch screen that may emanate through the bezel 108 surrounding the display 101. The swiping interfaces 111-116 may additionally or alternatively include additional touch cells. In both instances, haptic feedback may be provided to assist the user in more accurately performing swipe motions. Example haptic feedback output signals include, but are not limited to, one or more of, a combination of, a pattern and/or a series or sequence of the same or different bumps, pulses, buzzes, taps, vibrations, etc. that are provided at evenly spaced intervals along a swiping interface 111-116.

The example processor 107 of FIG. 1 is configured and/or programmed to execute machine-readable instructions stored in a memory, such as the example memory 1064 of FIG. 10, to at least receive and process touch input signals from touch cells (discussed below) of the swiping interface (s) 111-116, and to operate the laptop 100 according to the received touch input signals. Example touch input signals may represent control signals, operation commands, instructions, text, etc. that the processor 107 it to carry out to operate the laptop computer 100 and/or applications to be executed thereon (e.g., e-mail, word processing, Internet browsing applications, video players, music players, note taking applications, etc.) according to the user's inputs. In the case of swiping motions, the processor 107 decodes the received touch input signals to determine, for example, starting position, ending position, speed, direction, acceleration, etc. Example swiping motions can be used to, among other things, unlock the laptop 100, adjust a volume, adjust a brightness, scroll the contents of a window, navigate a list of items, move forward in a web browser window, move backward in a web browser window, open an application, etc.

The example processor 107 may be similarly configured and/or programmed to receive and process inputs from the keyboard 102 and the trackpad 104 to control, operate, provide instructions, type text, etc. for operating the laptop computer 100 and/or executing applications thereon (e.g., e-mail, word processing, Internet browsing applications, music players, video players, note taking applications, etc.) according to the user's inputs. In some implementations, the display 101 may be a touch screen display that may likewise receive user inputs to be processed by the processor 107 to control the laptop computer 100.

Any or all of the example keyboard 102, the trackpad 104 and/or the swiping interfaces 111-116 may be selectively disabled to reduce power consumption and/or to avoid unintentional or inadvertent contact with one of these input devices from being processed when the laptop 100 is in use in a particular mode. For example, when swiping motions are not supported by an application currently running, the swiping interfaces 111-116 may be disabled. When operating in a tablet mode (rather than the laptop mode shown in FIG. 1) the keypad 102 and/or the trackpad 104, as well as selected swiping interfaces, may be disabled to avoid unintentional or inadvertent inputs. In some situations, the disabling and enabling of the input devices, including the swiping interfaces 11-116, may be implemented automatically, for example, by the processor 107, based on, for example, a determination of whether or not input is supported by a currently running application, an operating mode of the computing device 100 and the like. In some situations, the disabling and enabling of the input devices, including the swiping interfaces 111-116, may be selectively implemented by the user.

Figure 2A:
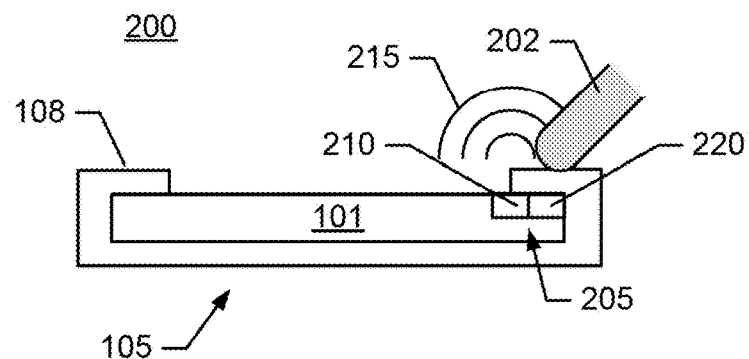
FIGS. 2A-2B are cross-sectional views of example swiping interfaces in accordance with the teachings of this disclosure.

Turning to FIG. 2A, a side cross-sectional view of an example display apparatus 200 in accordance with the teachings of this disclosure is shown. FIG. 3 is a top view of an example swiping interface 205 for the apparatus 200 of FIG. 2. The example display apparatus 200 of FIG. 2A includes the example lid 105 including the display 101. In the example shown in FIG. 2A, the display 101 is a touch screen display 101 that can detect touch inputs at or near a touch surface of the display 101. To enable inputs via swiping, sliding, tapping, etc. by a finger or stylus 202, the apparatus 200 includes a swiping interface 205. As shown, swiping interface 205 may include at least one touch cell 210 defining a portion of the touch screen 101. The swiping interface 205 may be implemented by the example swiping interface 205 of FIG. 3. As shown in FIGS. 2A and 3, the swiping interface 205 includes a plurality of touch cells, one of which is designated with the reference numeral 210. In this example, the plurality of touch cells 210 is arranged in a linear configuration, lengthwise along an edge portion of the touch screen 101, however, the plurality of touch cells 210 may be arranged otherwise.

Figure 2B:
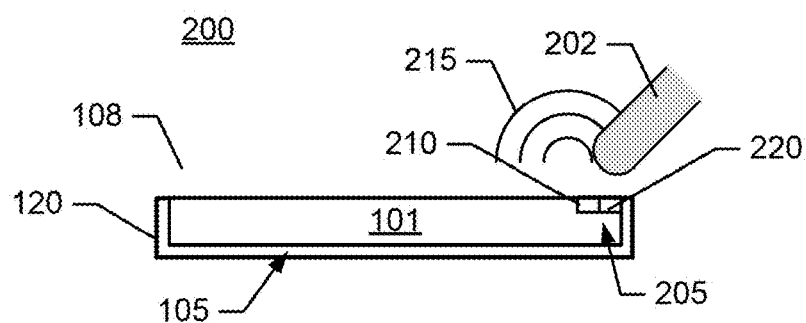
Figure 3:
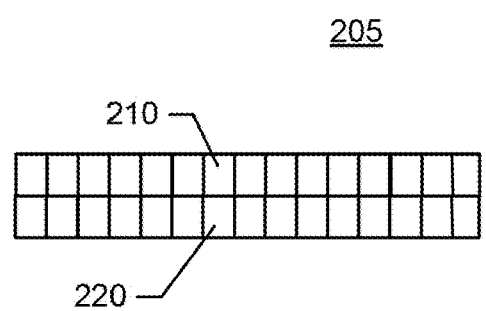
FIG. 3 is a top view of the example swiping interface of FIGS. 2A-2B.

In some implementations, as shown in FIG. 2B, the swiping interface 205 may be included in, for example, a smartphone computing device or a tablet computing device, in which the touch screen display 101 may be received in the housing 105. In this situation, the housing 105 may include lateral sides defined by edge portions 120 as previously described, but may not necessarily include a bezel 108 as shown in FIG. 2A, surrounding the touch screen display 101. In this arrangement, the swiping interface 205 may be positioned along the edge of the display 101, as shown in FIG. 2A.

In some implementations, different touch cells 210 of the plurality of touch cells 210 may have different signal strengths. Each touch cell 210 may emit a touch signal 215 that partially overlaps the touch screen display 101 and partially overlaps the bezel 108. To better allow touch signals 215 to be emitted through the bezel 108, the bezel 108 may be plastic. In this way, the touch cell 210 supports touch inputs for the display 101 and the bezel 108 to enable input of swipes, slides, taps, etc. by the stylus or finger 202 along the bezel 108. Example touch cells 210 include, but are not limited to capacitive sensors, resistive sensors, pressure sensors, force sensors, piezoelectric sensors, and other types of sensors and/or combinations of sensors.

In some implementations, the example apparatus 200 of FIG. 2 includes haptic (e.g., tactile) feedback devices, one of which is designated at reference numeral 220. For example, as a user swipes along the swiping interface 205, haptic, or tactile, feedback can be provided as the stylus or finger 202 passes along each interval or portion of the swiping interface 205. This haptic, or tactile, feedback may help the user more accurately perform swipes along the swiping interface 205, for example, length specific swipes, back and forth swipes, etc. In some implementations, the touch cells 210 may be arranged in one or more rows, and the haptic devices 220 may be arranged in one or more rows, for example, adjacent to one or more of the rows of touch cells 210. In some implementations, individual touch cells 210 may be alternately arranged with individual haptic devices 220.

Figure 4:
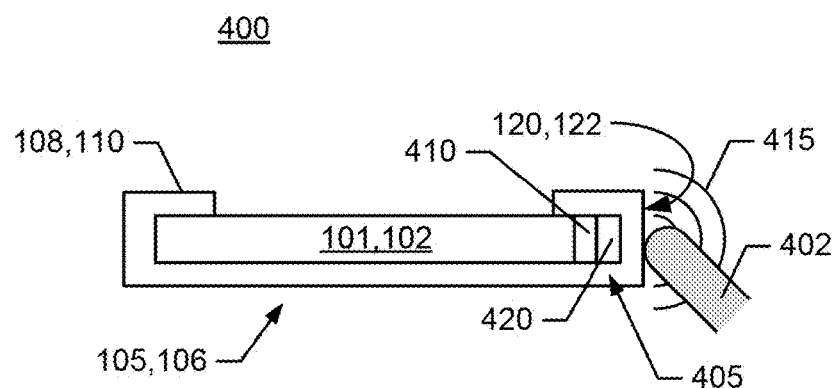
FIG. 4 is a cross-sectional view of another example swiping interface in accordance with the teachings of this disclosure.

Turning to FIG. 4, a side cross-sectional view of another example apparatus 400 in accordance with the teachings of this disclosure is shown. The example apparatus 400 of FIG. 4 may be used to implement the base 105 and the lid 106. To enable inputs via swiping, sliding, tapping, etc. by a stylus or finger 402, the apparatus 400 includes a swiping interface 405. Similar to the example described above with respect to FIG. 2, albeit rotated, the swiping interface 405 includes a plurality of touch cells, one of which is designated at reference numeral 410. The plurality of touch cells 410 may be arranged in a substantially linear configuration, lengthwise along an edge portion 120, 122 of the base 105 or the lid 106, however, they may be arranged otherwise. Different touch cells 410 of the plurality of touch cells 410 may have different signal strengths. As shown, each touch cell 410 emits a touch signal 415 through the edge portion 120, 122 of the respective housing 105, 106. To better allow touch signals 415 to be emitted through the edge portion 120, 122 of the respective housing 105, 106, the edge portion 120, 122 may be plastic. In this way, the touch cell(s) 410 may receive touch inputs for the base 105 and lid 106 to enable input of swipes, slides, taps, etc. by the stylus or finger 402 along the length the edge portion 120, 122 of the respective housing 105, 106. Example touch cells 410 include, but are not limited to capacitive sensors, resistive sensors, pressure sensors, force sensors, piezoelectric sensors, and other types of sensors and/or combinations of sensors.

In some implementations, the example apparatus 400 of FIG. 4 includes haptic (e.g., tactile) feedback devices, one of which is designated at reference numeral 420. For example, as a user swipes along the swiping interface 405, haptic, or tactile, feedback can be provided as the stylus or finger 402 passes along each interval of the swiping interface 405. This haptic, or tactile, feedback may help the user more accurately perform swipes along the swiping interface 405, for example, length specific swipes, back and forth swipes, etc. In some implementations, the touch cells 410 may be arranged in one or more rows, and the haptic devices 420 may be arranged in one or more rows, for example, adjacent to one or more of the rows of touch cells 410. In some implementations, individual touch cells 410 may be alternately arranged with individual haptic devices 420.

Figure 5:
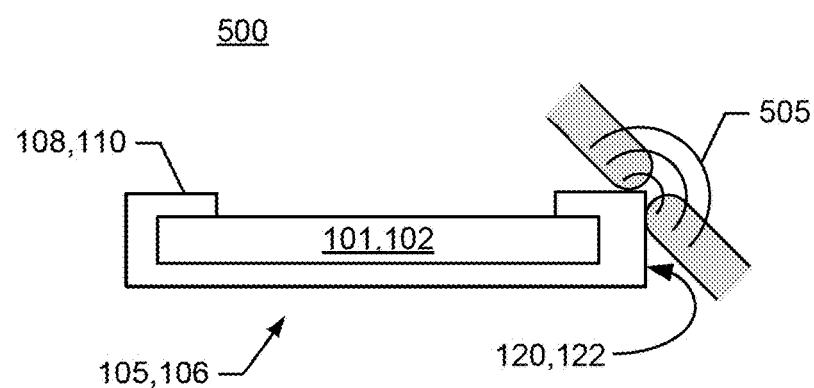
FIG. 5 is a cross-sectional view of still another example swiping interface in accordance with the teachings of this disclosure.

FIG. 5 is a side-cross sectional view of still another apparatus 500 in accordance with the teachings of this disclosure is shown. In this example, a touch signal 505 may be generated using either of the example swiping interfaces 205, 405 of FIGS. 2-4. In contrast to FIGS. 2 and 4, in this example the touch signal 505 is emitted to allow simultaneous swiping on a combination of the bezel 108 and the edge portion 120 of the lid 105, and/or on a combination of the border 110 and the edge portion 122 of the base 106. In some examples, both of the apparatus 200 and the apparatus 400 are implemented to allow a user to (re-)configure bezel 108/border 110 and/or edge portion 120, 122 swiping. Similar to the examples of FIGS. 2 and 4, the apparatus 500 may include haptic feedback devices similar to those discussed above.

Turning to FIGS. 6A-6H, 7A-7B, 8 and 9A-9B, various example usages of the example swiping interfaces disclosed herein are shown. While examples are shown in FIGS. 6A-6H, 7A-7B, 8 and 9A-9B, there are many other ways of using the examples taught in this disclosure. Moreover, the examples shown may be combined in various ways. Further, while example user interface elements are shown and discussed herein, the example swiping interfaces disclosed herein may be used with other computing devices.

As illustrated in the example shown in FIGS. 6A-6H, back and forth swiping motions and, in some examples, taps can be used to, for example, unlock operation of the laptop 100, execute an application, navigate tabs in a browser, arrange or sort items in a list or menu, and the like. This type of example usage may be used on any type of computing device and on any surface of a computing device able to implement a swiping interface through which this type of input may be received and processed. An action may be executed by the computing device based on a swipe input detected by the plurality of touch cells defining the swiping interface 111-116. In some implementations, the swipe input may include a series or sequence of movement along the swiping interface 111-116, defining a particular pattern, which may be associated with, for example, a particular command, or password, or code. For example, in some implementations, a particular swipe pattern detected at the swipe interface may be associated with a password or code to unlock operation of the computing device, gain access to a feature available through the computing device, and the like. In some implementations, a particular swipe pattern detected at the swiping interface 111-116 may be associated with a particular command, or shortcut, causing the computing device to execute an action associated with that particular swipe pattern such as, for example, launch a particular application, navigate to a particular screen, or other such action for which a preset command or shortcut may enhance user convenience and productivity. In some implementations, the detected swipe input at the swiping interface 111-116 may be specific to the application currently being executed and/or current interaction of the user with the computing device, and thus not associated with a previously set command or password or code, such as, for example, adjustments in volume and/or brightness, navigation through tabs, sorting of lists and/or menu items and the like.

Figure 6A:
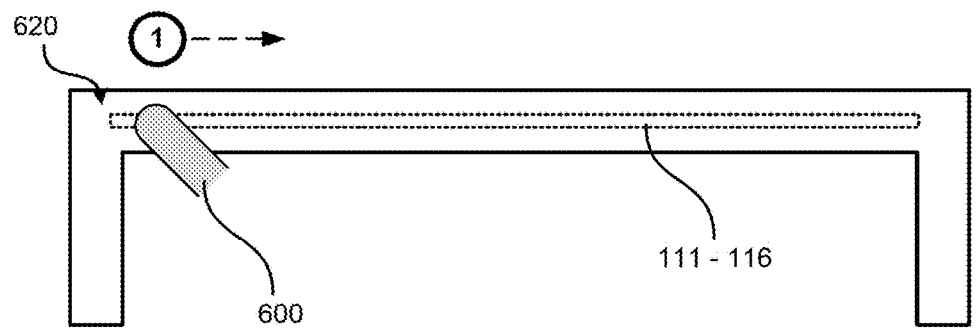
FIGS. 6A-6H illustrate example usages of the example swiping interfaces disclosed herein.
Figure 6B:
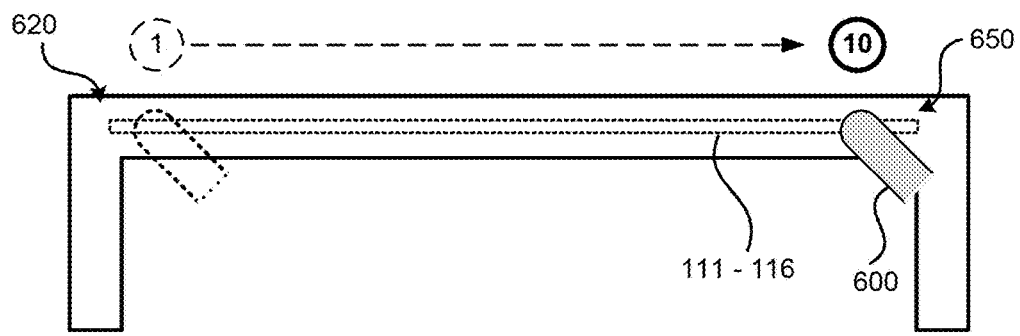
Figure 6C:
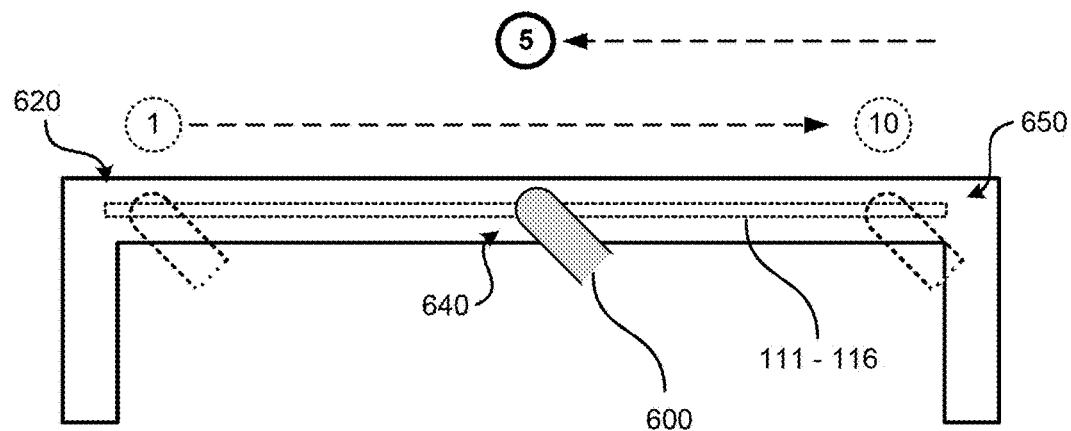
Figure 6D:
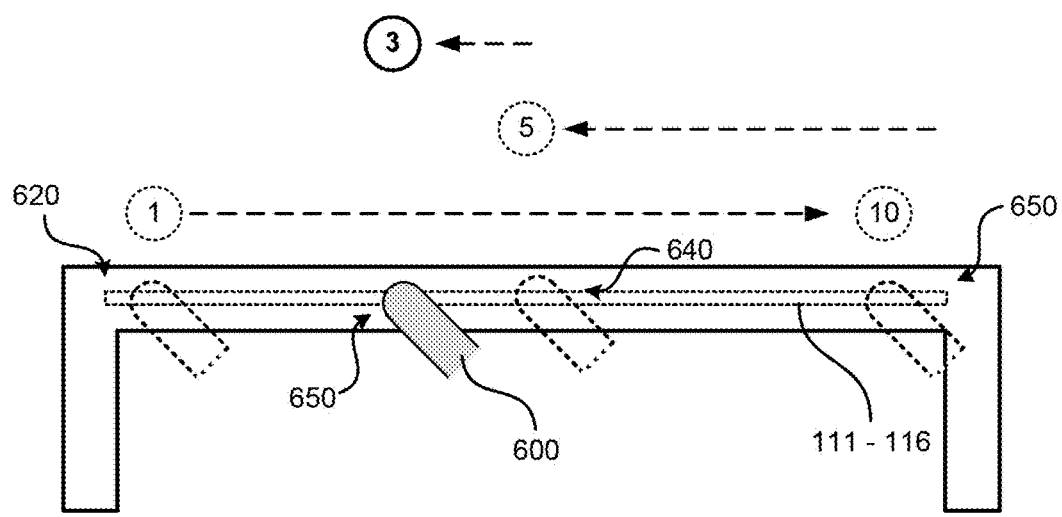

The example shown in FIGS. 6A-6D begins with a user placing a stylus or finger 600 at the left end portion 620 of the swiping interface 111-116, as shown in FIG. 6A. In this example, the detected placement of the stylus or finger 600 at the left end portion 620 provides an entry of the digit "1." The user then swipes or slides the stylus or finger 600 toward the right end portion 650 of the swiping interface 111-116, pausing, or changing direction, at a position along the swiping interface corresponding to the digit "10" to enter the digit "10", as shown in FIG. 6B. From the position at the right end portion 650 of the swiping interface 111-116 shown in FIG. 6B, the user then swipes toward the left end portion 620 of the swiping interface 111-116, to input the digit "5" at an first intermediate portion 640 of the swiping interface 111-116, as shown in FIG. 6C, and then the digit "3" at a second intermediate portion 630 of the swiping interface 111-116, as shown in FIG. 6D, thus completing the entry of a four digit passcode of "1 - 10 -5 - 3." Alternatively, in some examples, the user can tap locations along the swiping interface 111-116 corresponding to the digits "1" "10" "5" and "3" to enter the passcode. In some examples, a user may use taps and swipes, and/or combinations thereof, to enter digits.

As illustrated in the examples shown in FIGS. 6E-6H, in some implementations, an index 680 may be displayed, for example, in an area adjacent to the swiping interface 111-116, to facilitate user entry of, for example, an unlock command or code or password using a swiping and/or tapping motion on the swiping interface 111-116 as described above with respect to FIGS. 6A-6D. For example, in some implementations, the index 680 may be displayed in an area of the display 101 adjacent to the swiping interface 111-116 positioned along, for example, the bezel of the lid 105, or the edge portion 120 of the lid 105, or an edge portion of the display 101 itself. In some implementations, in which the laptop computer 100 is in a closed position, and is to be unlocked using a swiping interface 111-116 on the edge portion 120 of the lid 105 or on the edge portion 122 of the base 106, without the display 101 being active and/or available for display of the index 680, the index 680 may be implemented as a series of soft buttons along the swiping interface 111-116 (as in the example shown in FIG. 7C, to be discussed below).

As shown in FIGS. 6E-6H, in some implementations, the index 680 may be displayed as a series of elements aligned in a manner corresponding to the adjacent swiping interface 111-116. The index 680 may provide a visual indication to the user of points along the swiping index 111-116 at which to stop and/or change direction and/or release a touch and/or tap in order to enter a particular corresponding element. In the examples shown in FIGS. 6E-6H, the elements displayed in the index 680 are numbers, simply for ease of discussion and illustration. However, other elements such as, for example, letters, shapes, pictures and the like, and/or combinations of various different types of elements, may be included in the index 680.

Figure 6E:
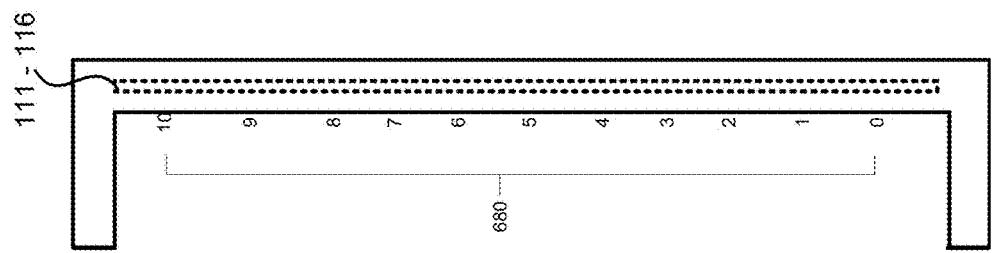
Figure 6F:
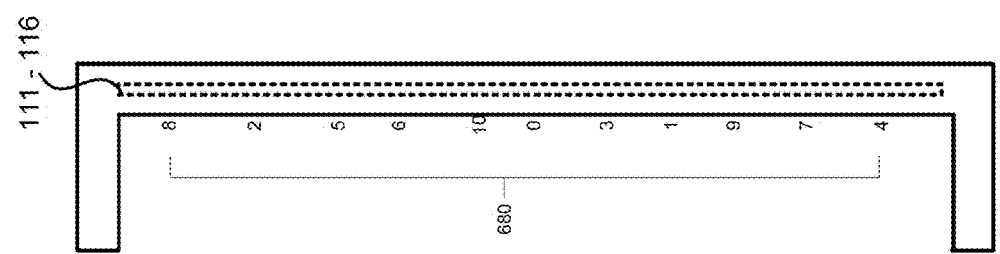
Figure 6G:
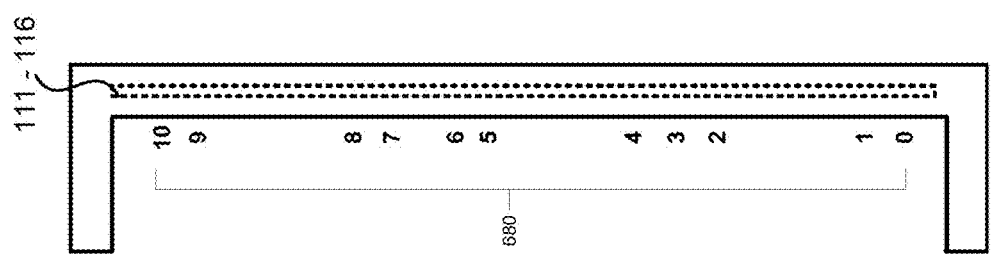
Figure 6H:
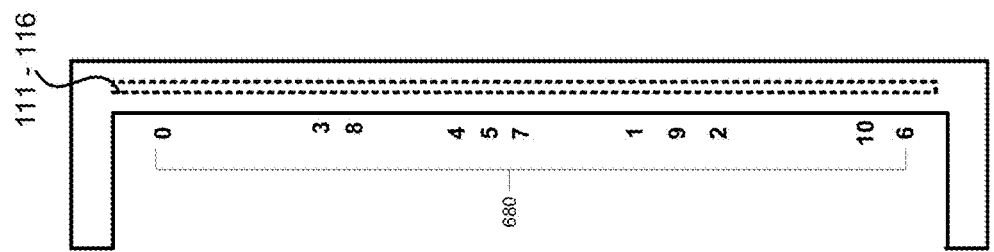

In the example shown in FIG. 6E, the elements (numbers, in this example) of the index 680 are arranged in numerical order, and substantially evenly spaced along the length of the index 680. To provide for secure entry of an unlock command or code or password, in some implementations, the elements of the index 680 may be displayed at a relatively small size, so that individual elements of the index 680 are only clearly visible to the user entering the command or code or password. In some implementations, an order in which the elements of the index 680 are displayed may be randomly changed, as shown in FIG. 6F. In some implementations, spacing between elements of the index 680 may be randomly changed, as shown in FIG. 6G. In some implementations, both the order of the elements and the spacing of the elements of the index 680 may be randomly changed, as shown in FIG. 6G. Other arrangements and/or alterations of the elements of the index 680 may also be incorporated. By adjusting the positioning of the elements of the index 680, even if a pattern of entry via the user's swipes or taps on the swiping interface 111-116 is observed by an outsider, the observed pattern can not be readily correlated with a specific element or set/series of elements of the index 680, and thus the command or code or password is not easily discernable by an outside observer simply based on observation of the user's swipes or taps.

As noted above, the pattern of the swipe input detected by the plurality of touch cells at the swiping interface 111-116 may be associated with, or correlated with, a password or code to, for example, unlock the computing device for operation, allow access to features available through the computing device and the like. The pattern of the swipe input detected by the plurality of touch cells at the swiping interface 111-116 may be associated with a command to, for example, launch a selected application, a shortcut to launch a particular application and/or module of a particular application associated with the particular swipe pattern, and the like. The pattern of the swipe input detected by the plurality of touch cells at the swiping interface 111-116 may be specific to an application currently being executed by the computing device and/or a user's current interaction with the computing device to, for example, adjust a brightness and/or volume level, rearrange and/or sort items displayed on the display, navigate tabs in a browser, and the like.

As illustrated in the example shown in FIGS. 7A-7C, swiping motions and, in some examples, taps can be used to adjust a parameter or operation of the laptop 100. This type of example usage may be used on any type of computing device and on any surface of a computing device able to implement a swiping interface through which this type of input may be received and processed. As shown in FIGS. 7A-7B, the swiping motion may begin with a user placing a stylus or finger 700 at a first portion 720 of the swiping interface 111-116, as shown in FIG. 7A. Detection of the stylus or finger 700 on the swiping interface 111-116 may provide an indication of an input to adjust a parameter or operation of the laptop 100, such as, for example, adjust a brightness level of the laptop 100. The user then swipes or slides the stylus or finger 700 toward a second portion 750 of the swiping interface 111-116, pausing, or changing direction, or releasing the touch, at a position along the swiping interface 111-116 corresponding to a desired brightness level, as shown in FIG. 7B, to increase a brightness level of the display 101. Other parameters, operations and/or user interfaces elements that may be adjusted, controlled, set, etc. includes, but is not limited to, volume, scrolling, forward, backward, play, stop, etc.

FIG. 7C is a side view of the example lid 105 of FIGS. 7A-7B. As shown in FIG. 7C, the swiping interface 111-116 may be configured to implement soft or touch buttons in accordance with the teachings of this disclosure, one of which is designated at reference numeral 705.

Figure 8A:
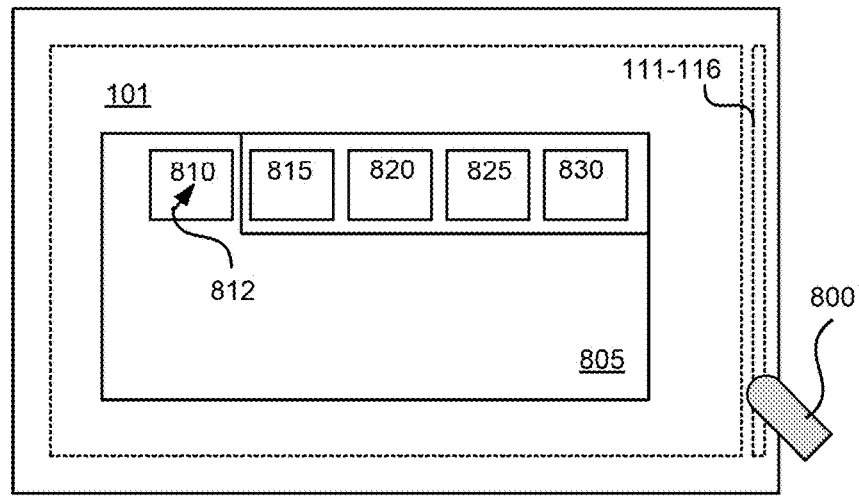
FIGS. 8A-8C illustrate still further example usages of the example swiping interfaces disclosed herein.
Figure 8B:
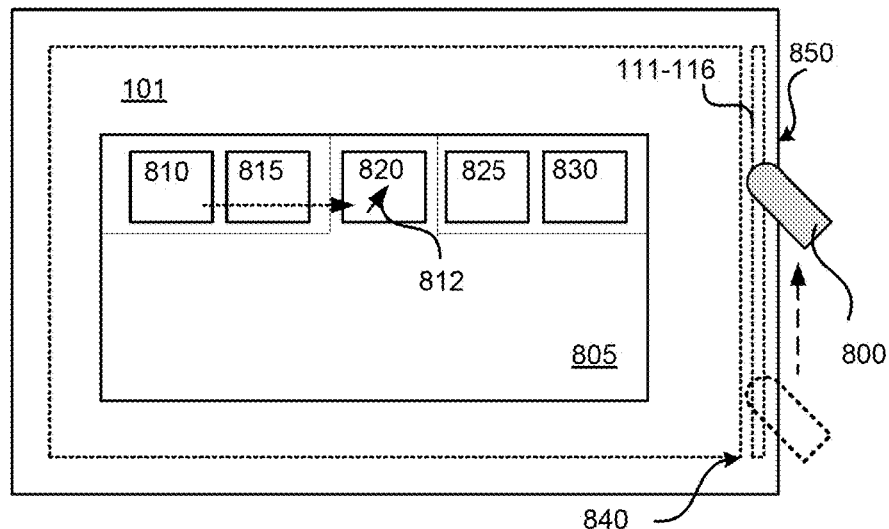
Figure 8C:
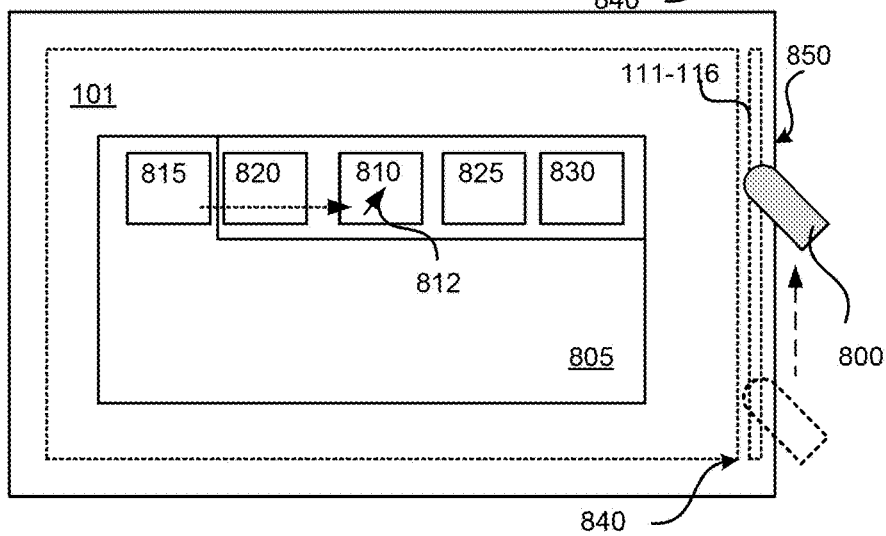

As illustrated in the example shown in FIGS. 8A-8C, swiping motions can be used to navigate between tabs of a web browser 805. In some implementations, the user may tap locations along the swiping interface 111-116 to select a desired tab. As shown in FIGS. 8A-8C, the swiping motion may begin with a user placing a stylus or finger 800 at a first portion 850 of the swiping interface 111-116, corresponding to a first tab 810, with a cursor 812 at the first tab 810 to provide a visual indication to the user, as shown in FIG. 8A. Detection of the stylus or finger 800 on the swiping interface 111-116 may provide an indication of an input to navigate among features of the web browser 805, such as, for example, navigate from the first tab 810 to a second tab 820, rearrange the order of one or more tabs displayed by the browser 805, and the like. As the user then swipes or slides the stylus or finger 800 along the swiping interface 111-116, from the first portion 840 toward a second portion 850 of the swiping interface 111-116 corresponding to the second tab 820, the cursor 812 is displayed at a corresponding position with respect to the tabs 810, 815, 820, 825 and 830. Upon detection of a pause, or change in direction, or release of the touch at the portion of the swiping interface 111-116 corresponding to the second tab 820, the second tab 820 may be brought to the front of the grouping of tabs, as shown in FIG. 8B, and/or the tabs may be rearranged, as shown in FIG. 8C.

As illustrated in the example shown in FIGS. 9A and 9B, swiping motions and, in some examples, taps can be used to navigate through or select items from a list of items via a swiping interface 111-116 for example, along an edge portion 120,122 of a housing 105, 106. The example usage may be used on any type of computing device and on any surface of a computing device able to implement a swiping interface through which this type of input may be received and processed. As shown in FIGS. 9A-9B, a swiping motion is being used to select from a plurality of user interface elements 902-904, arranged in a row in this example. The example elements 902-904 may represent any collection or list of windows, files (e.g., audio, video, image, etc.), applications, selections, information, etc., and may be arranged in other ways (e.g., vertically, diagonally, rectilinearly, circularly, etc.). The elements 902-904 may also be used to represent a scrollable list of items. As a stylus or finger 900 moves along the swiping interface 111-116, from a first portion 920 of the swiping interface 111-116, as shown in FIG. 9A, toward a second portion 930 of the swiping interface 111-116, as shown in FIG. 9B, a cursor 910 moves in a corresponding manner across the elements 902-904, to provide a visual indication to the user. A side view of the example lid of FIG. 9A is shown in FIG. 9C.

One or more of the elements and interfaces shown herein may be combined, divided, re-arranged, omitted, eliminated and/or implemented in any other way. Further, one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. can be used. Moreover, more interfaces and/or elements may be included instead of, or in addition to, those shown, and/or may include more than one of any or all of the illustrated interfaces and elements. The elements shown may, for example, be implemented as machine-readable instructions carried out by one or more processors. A processor, a controller and/or any other suitable processing device such as those shown in FIG. 11 may be used, configured and/or programmed to execute and/or carry out the examples disclosed herein. For example, the disclosed examples may be embodied in program code and/or machine-readable instructions stored on a tangible and/or non-transitory computer-readable medium accessible by a processor, a computer and/or other machine having a processor, such as that discussed below in connection with FIG. 11. Machine-readable instructions comprise, for example, instructions that cause a processor, a computer and/or a machine having a processor to perform one or more particular processes. Many other methods of implementing the disclosed examples may be employed. For example, the order of execution may be changed, and/or one or more of the blocks and/or interactions described may be changed, eliminated, sub-divided, or combined. Additionally, any or the entire example may be carried out sequentially and/or carried out in parallel by, for example, separate processing threads, processors, devices, discrete logic, circuits, etc.

Figure 10:
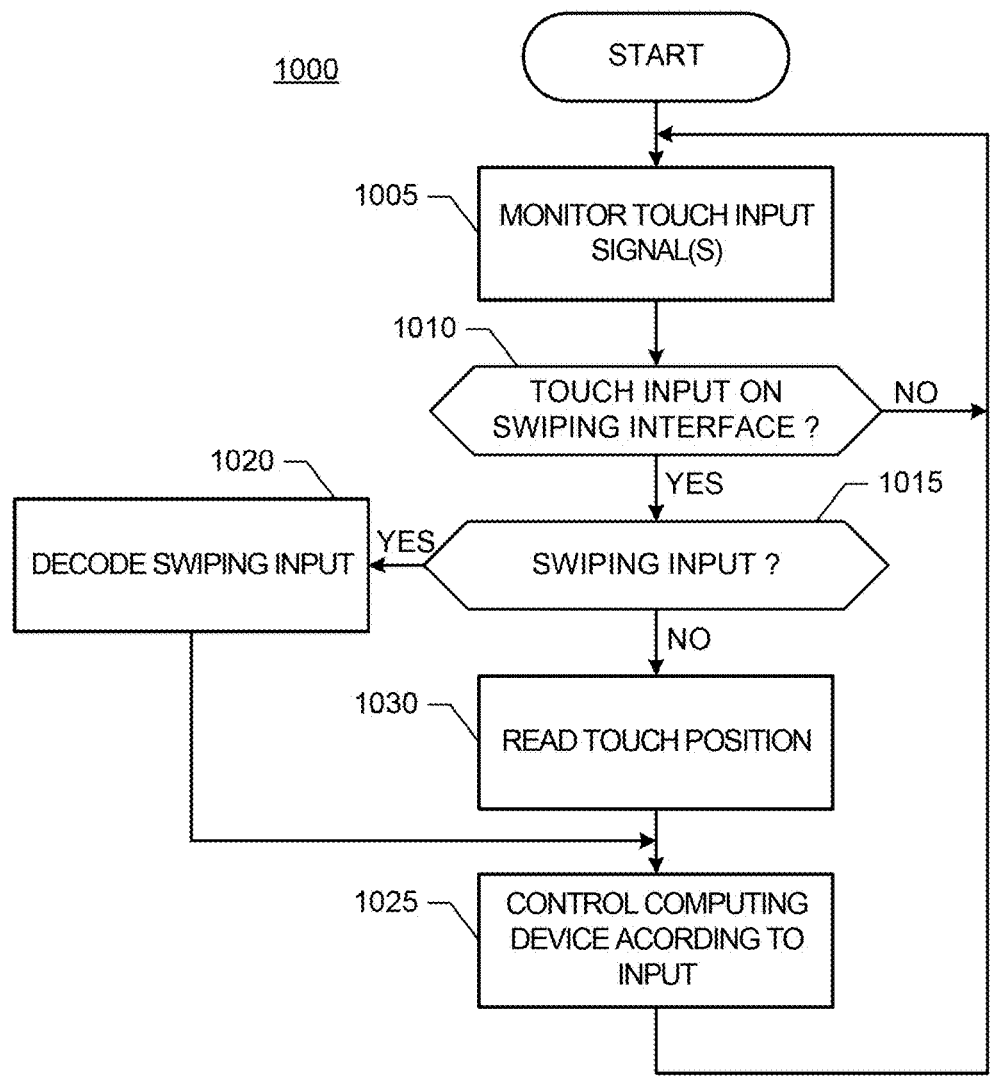
FIG. 10 is a flowchart illustrating an example method that may, for example, be implemented using machine-readable instructions executed by one or more processors to perform the example methods and usages disclosed herein.

Turning to FIG. 10, an example method 1000 that may be performed to operate swiping interfaces as disclosed herein is shown. The example method 1000 of FIG. 10 begins with a processor (e.g., the processor 1052 of FIG. 11) monitoring for touch input signals (block 1005). When touch input signals are received (block 1010), the processor determines whether the inputs are a swiping input or a non-moving input (block 1015). If it is determined that the detected touch input is a swiping input (block 1015), the processor decodes the received touch input signals to, for example, decode starting position, ending position, speed, direction, acceleration, and the like (block 1020), and controls the computing device according to the decoded received touch input signals (block 1025). Control then returns to block 1005 to monitor for inputs detected at the swiping interface.

Returning to block 1015, if non-swiping input were received (block 1015), the processor controls the computing device according to the received touch input signals (block 1025). Control then returns to block 1005 to monitor for swiping interface signals.

The example method 1000 of FIG. 10, or other methods disclosed herein, may, for example, be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example method 1000 of FIG. 10, or other methods disclosed herein may be embodied in program code and/or machine-readable instructions stored on a tangible and/or non-transitory computer-readable medium accessible by a processor, a computer and/or other machine having a processor, such as that discussed below in connection with FIG. 11. Machine-readable instructions comprise, for example, instructions that cause a processor, a computer and/or a machine having a processor to perform one or more particular processes. Many other methods of implementing the example method 1000 of FIG. 10, or other methods disclosed herein may be employed. For example, the order of execution may be changed, and/or one or more of the blocks and/or interactions described may be changed, eliminated, sub-divided, or combined. Additionally, any of the entire example method 1000 of FIG. 10, or other methods disclosed herein may be carried out sequentially and/or carried out in parallel by, for example, separate processing threads, processors, devices, discrete logic, circuits, etc.

As used herein, the term "computer-readable medium" is expressly defined to include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Turning to FIG. 10, an example of a generic computing device 1100 and a generic mobile computing device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, connections, memories, caches, etc. and may be mounted on a common motherboard or in other manners as appropriate. The processor 1102 can process instructions for execution within the computing device 1100, including instructions stored in the memory 1104 or on the storage device 1106 to light-emitting portion graphical information for a GUI on an external input/output device, such as light-emitting portion 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, light-emitting portion 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, Wi-Fi) may be coupled to one or more input/output devices, such as a touch cell, a piezoelectric haptic device, a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a light-emitting portion 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and light-emitting portion interface 1156 coupled to a light-emitting portion 1154. The light-emitting portion 1154 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface 1156 may comprise appropriate circuitry for driving the light-emitting portion 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single Inline Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory 1164, expansion memory 1174, or memory on processor 115 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard, a touch cell and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile or haptic feedback); and input from the user can be received in any form, including acoustic, speech, touch, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A computing device, comprising:
   a first housing;
   a display disposed within the first housing;
   a first plurality of touch cells disposed within the first housing, in a linear arrangement outside of the display, wherein the first plurality of touch cells respectively emit a first plurality of signals through a first surface of the first housing;
   a processor; and
   a non-transitory computer-readable storage medium storing instructions that, when executed by the processor, cause the processor to:
      receive a first plurality of touch input signals from the first plurality of touch cells; and
      operate the computing device in accordance with the first plurality of touch input signals,
   wherein, in one of a plurality of modes, the first plurality of touch input signals corresponds to a swiping input detected by the first plurality of touch cells along an edge portion of the first surface of the first housing, a pattern of the swiping input corresponding to a previously stored code to unlock the computing device from a standby state or an off state.

2. The computing device of claim 1, wherein the first plurality of touch cells are aligned along an interior edge portion of the first housing, adjacent to the first surface of the first housing.

3. The computing device of claim 1, wherein the display comprises a touch screen, the touch screen having a second plurality of touch cells arranged on an edge portion of the display, the second plurality of touch cells respectively emitting a second plurality of signals through a second surface of the housing, and
   wherein the instructions, when executed by the processor, also cause the processor to:
      receive a second plurality touch input signals from the second plurality touch cells; and
      operate the computing device in accordance with the second plurality of touch input signals.

4. The computing device of claim 1, wherein, in operating the computing device in accordance with the first plurality of touch input signals, the instructions cause the processor to at least one of:
   unlock the computing device for operation from the standby state or the off state;
   adjust a volume level of the computing device;
   adjust a brightness level of the display;
   scroll contents of a window displayed on the display;
   navigate a list of items displayed on the display;
   move forward in a web browser window displayed on the display;
   move backward in a web browser window displayed on the display; or
   open an application for execution by the processor.

5. The computing device of claim 1, wherein the pattern of the swiping input is defined by a sequence including a plurality of pause points, a plurality of taps, or a combination of a plurality of pause points and taps, detected by the first plurality of touch cells at the first surface of the first housing, the plurality of pause points and/or plurality of taps defining the sequence being detected at a respective plurality of set positions on the first surface of the first housing corresponding to the previously stored code to unlock the computing device from the standby state or the off state.

6. The computing device of claim 1, wherein the housing comprises a smudge resistant material.

7. The computing device of claim 1, wherein the first surface comprises at least one of a bezel surrounding a peripheral portion of the display, a lateral edge of the first housing, or a top surface of the first housing.

8. The computing device of claim 1, further comprising:
   a second housing coupled to the first housing;
   a keyboard disposed in the second housing; and
   a second plurality of touch cells arranged along an edge portion of the second housing, the second plurality of touch cells respectively emitting a second plurality of signals through a second surface of the second housing,
   wherein the instructions cause the processor to:
      receive a second plurality of touch input signals from the second plurality touch cells; and
      operate the computing device in accordance with the second plurality of touch input signals.

9. The computing device of claim 8, wherein the second surface of the second housing comprises at least one of a border around the keyboard, a lateral edge portion of the second housing or a bottom surface of the second housing.

10. The computing device of claim 1, wherein the computing device is a portable computer, the computing device being selectively and foldably arrangeable in a plurality of different folded arrangements; and
    wherein the instructions cause the processor to:
       operate the computing device in response to the first plurality of touch input signals in a first mode of the plurality of modes when the computing device is in a first folded arrangement; and
       operate the computing device in a second mode of the plurality of modes in response to the first plurality of touch input signals when the computing device is in a second folded arrangement.

11. A method of operating a computing device having a housing and a display disposed within the housing, the method comprising:
    operating a plurality of touch cells to respectively emit a plurality of signals through the housing, the plurality of touch cells being arranged linearly within the housing, along an edge portion of the housing, outside the display;
    receiving a plurality of touch input signals from the plurality of touch cells; and
    operating the computing device in response to the plurality of touch input signals, including:
       detecting a swiping input at the edge portion of the housing corresponding to the plurality of touch input signals;
       detecting a pattern associated with the swiping input and
       in one of a plurality of modes, correlating the pattern with a previously stored code to unlock the computing device from a standby state or an off state, and
       unlocking the computing device from the standby state or the off state in response to the plurality of touch input signals.

12. The method of claim 11, wherein receiving the plurality of touch input signals from the plurality of touch cells includes:
  detecting the swiping input along an exterior surface of the housing, at a position on the exterior surface of the housing corresponding to a position of the plurality of touch cells within the housing; and
  correlating the detected swiping input to the plurality of touch inputs signals for processing by a processor of the computing device.

13. The method of claim 12, wherein operating the computing device in response to the plurality of touch input signals also includes, in another of the plurality of modes, at least one of:
  adjusting a volume of the computing device;
  adjusting a brightness of the display;
  scrolling contents of a window displayed on the display;
  navigating a list of items displayed on the display;
  moving forward in a web browser window displayed on the display;
  moving backward in a web browser window displayed on the display; or
  opening an application for execution by the computing device.

14. The computing device of claim 11, wherein the plurality of touch inputs includes a plurality of taps detected by the plurality of touch cells at an exterior surface of the housing, the plurality of taps being detected at a respective plurality of set positions on the exterior surface of the housing corresponding to the previously stored code to unlock the computing device from the standby state or the off state.

15. A computer program product embodied on a non-transitory computer readable medium, the computer readable medium having stored thereon a sequence of instructions which, when executed by a processor causes the processor to execute a method, the method comprising:
  operating a plurality of touch cells to respectively emit a plurality of signals through a housing of a computing device, the plurality of touch cells being arranged linearly within the housing, along an edge portion of the housing, outside a display positioned in the housing;
  receiving a plurality of touch input signals from the plurality of touch cells; and
  operating the computing device in response to the plurality of touch input signals, including:
    detecting a swiping input at the edge portion of the housing corresponding to the plurality of touch input signals;
    detecting a pattern associated with the swiping input and
    in one of a plurality of modes, correlating the pattern with a previously stored code to unlock the computing device from a standby state or an off state, and
    unlocking the computing device from the standby state or the off state in response to the plurality of touch input signals.

16. The computer program product of claim 15, wherein, in receiving the plurality of touch input signals from the plurality of touch cells, the method also includes:
  detecting the swiping input along an exterior surface of the housing, at a position on the exterior surface of the housing corresponding to a position of the plurality of touch cells within the housing;
  comparing the detected pattern of the swiping input to the previously stored code; and
  unlocking the computing device from the standby state or the off state in response to a determination that the pattern of the swiping input matches the previously stored code.

17. The computer program product of claim 16, wherein the pattern is defined by a sequence including a plurality of pause points, a plurality of taps, or a combination of pause points and taps detected at the exterior surface of the housing, the pattern of the swiping input matching the previously stored code when the plurality of pause points and/or plurality of taps defining the sequence are detected positions on the exterior surface of the housing corresponding to the previously stored code.

* * * * *